W. D. DOREMUS.
AUTOGRAPH TIME RECORDER.
APPLICATION FILED NOV. 28, 1905. RENEWED APR. 16, 1908.

900,059.

Patented Sept. 29, 1908.
7 SHEETS—SHEET 1.

Witnesses
C. H. Walker.
J. T. Walker.

Inventor
Willard D. Doremus,
By David H. Mead
Attorney

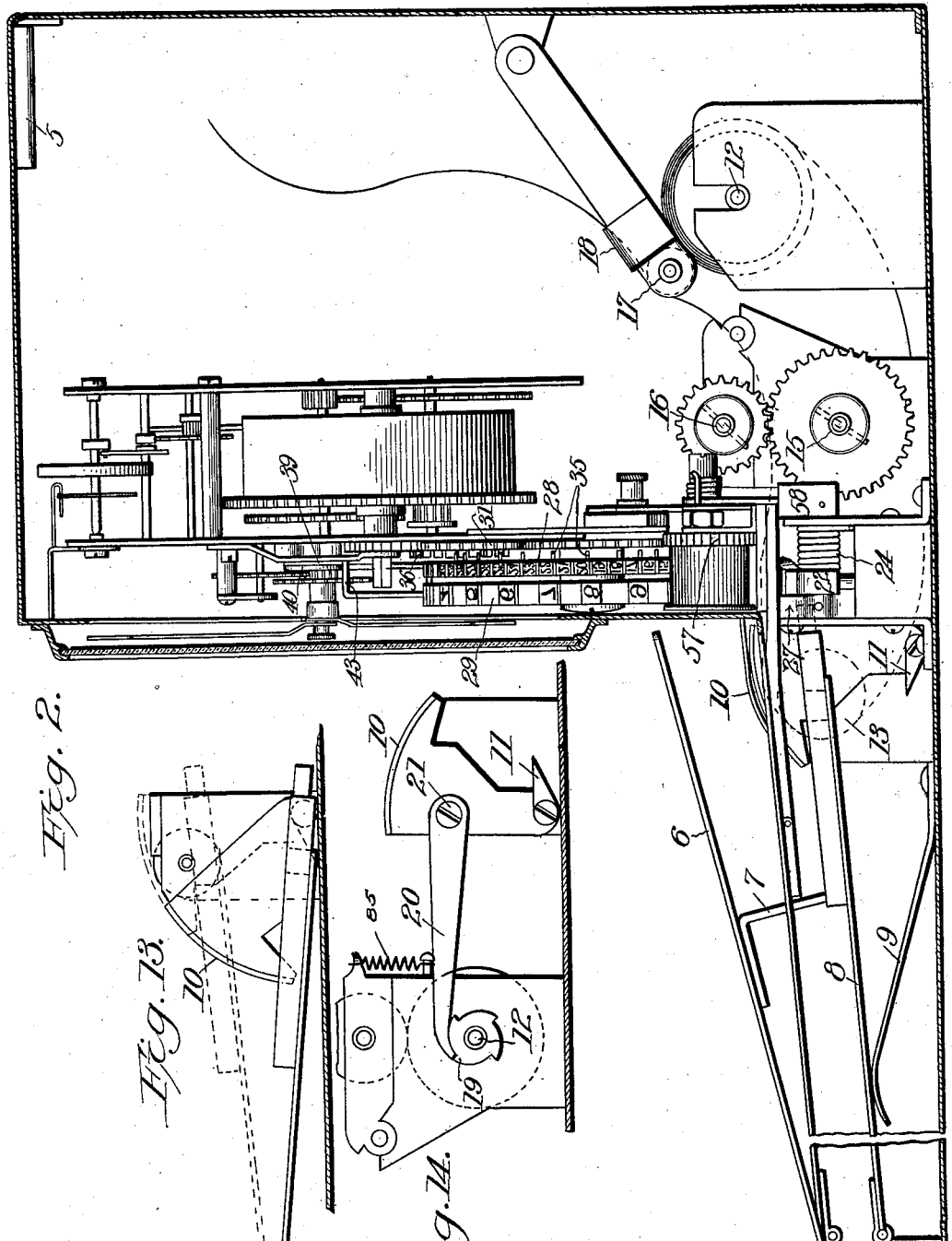

W. D. DOREMUS.
AUTOGRAPH TIME RECORDER.
APPLICATION FILED NOV. 28, 1905. RENEWED APR. 16, 1908.
900,059.
Patented Sept. 29, 1908.
7 SHEETS—SHEET 3.
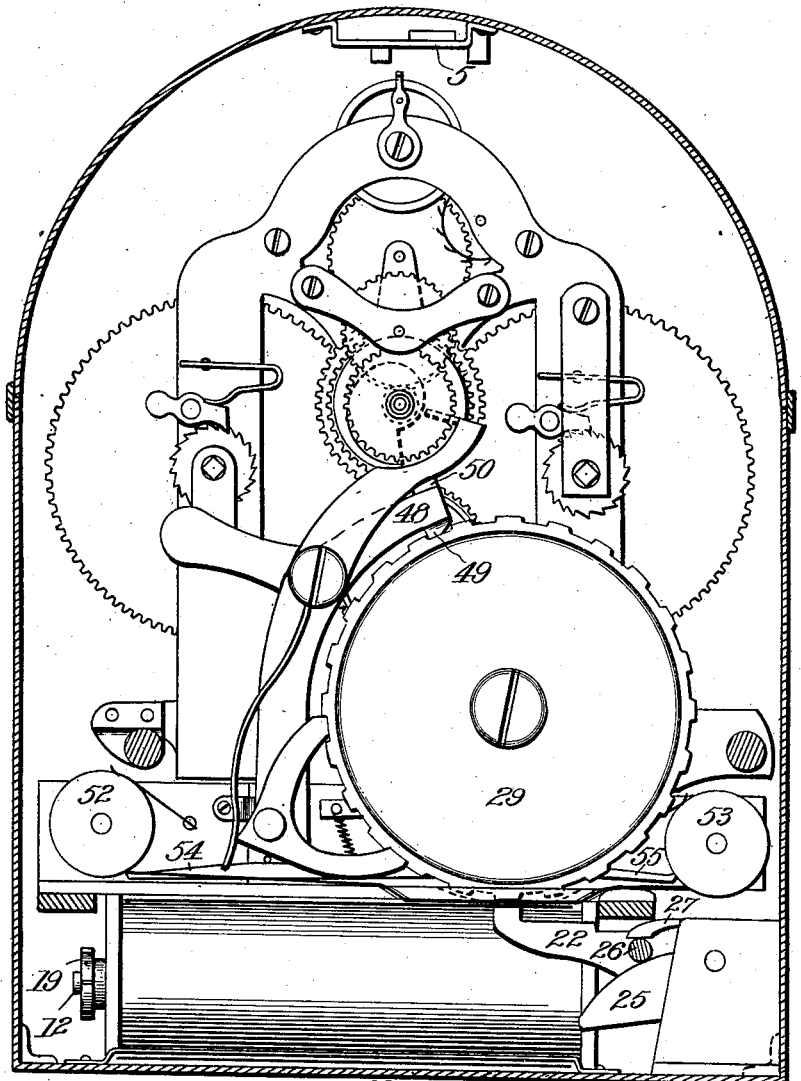
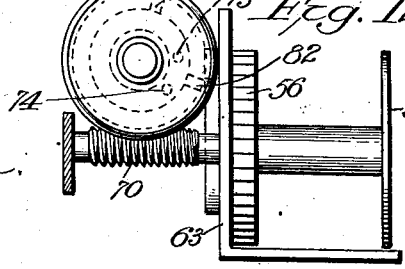

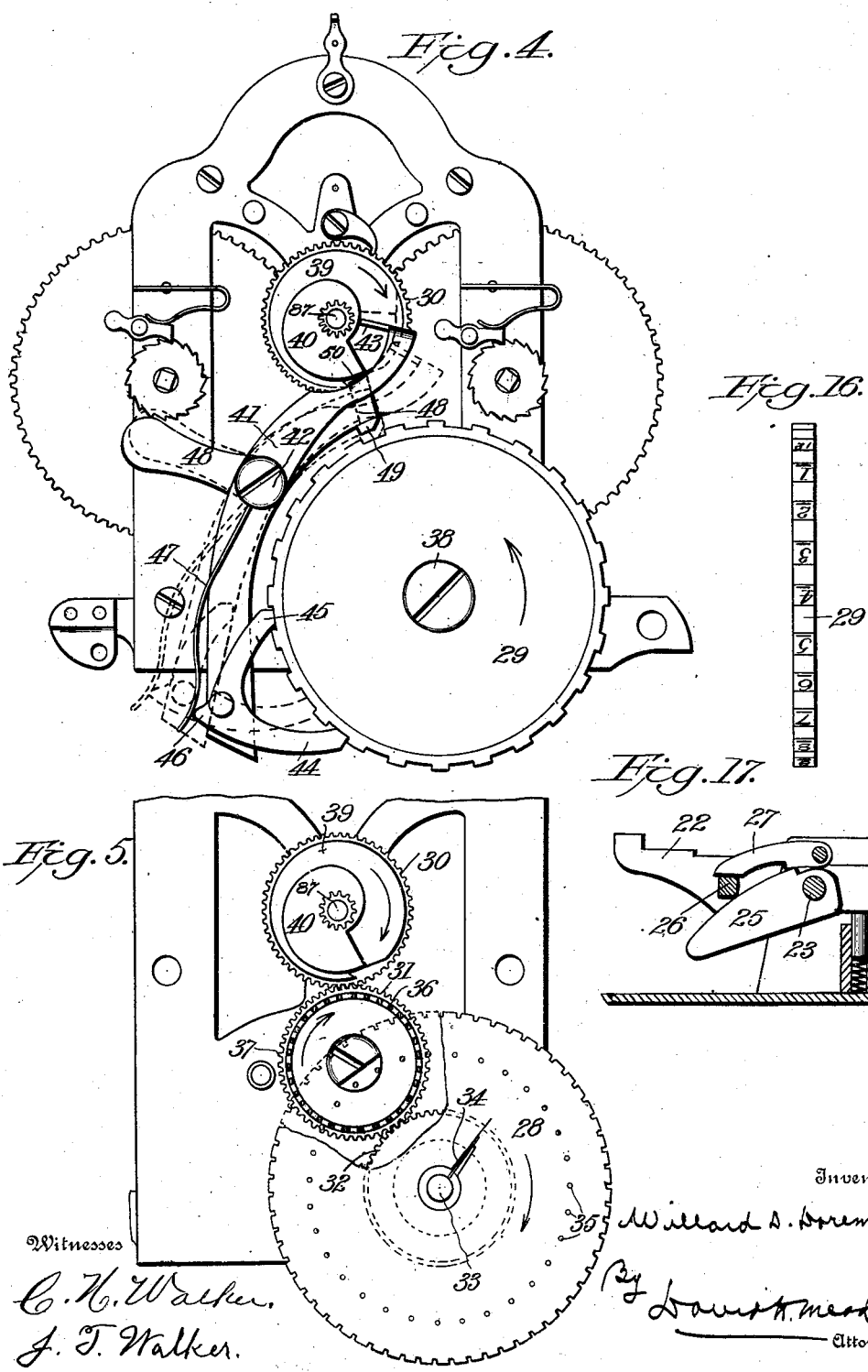

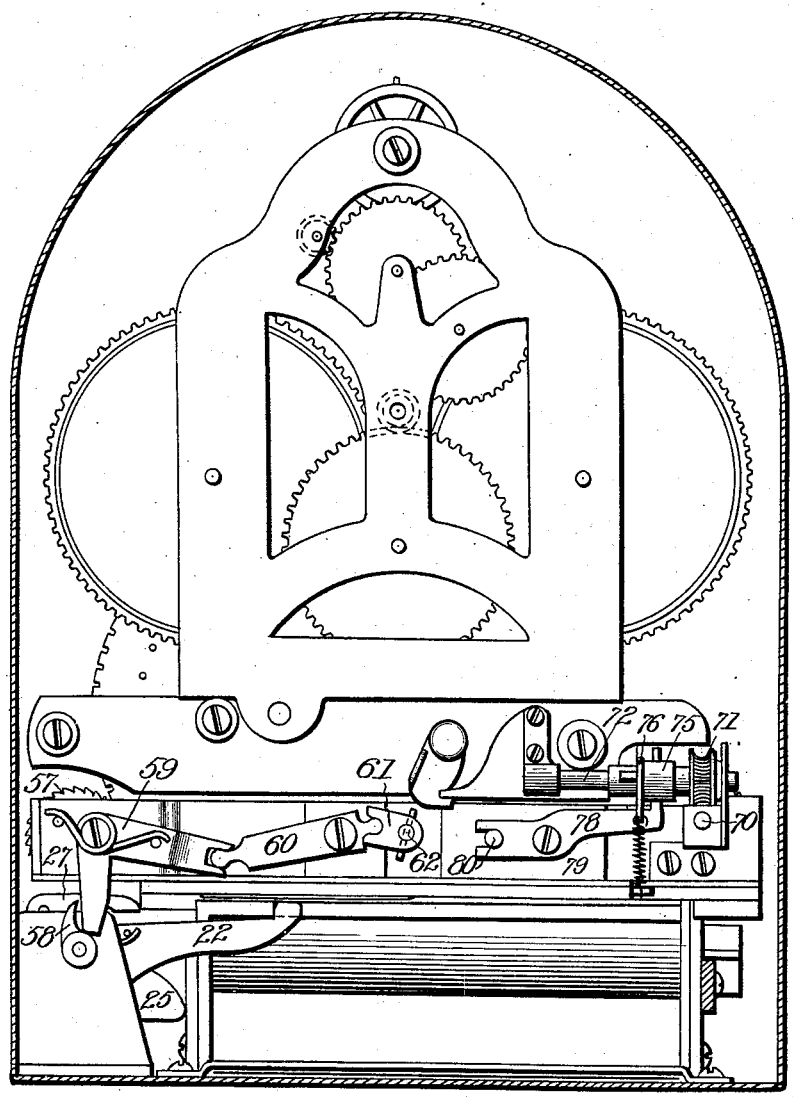

W. D. DOREMUS.
AUTOGRAPH TIME RECORDER.
APPLICATION FILED NOV. 28, 1905. RENEWED APR. 16, 1908.
900,059.
Patented Sept. 29, 1908.
7 SHEETS—SHEET 6.
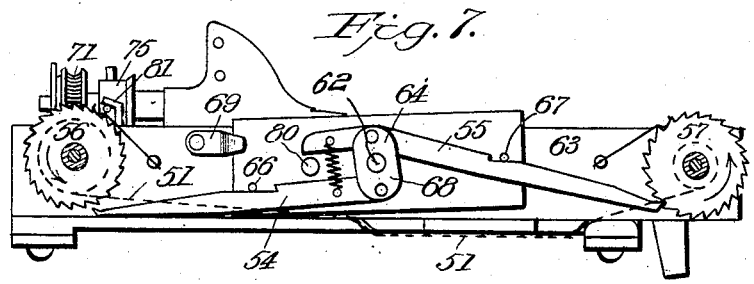
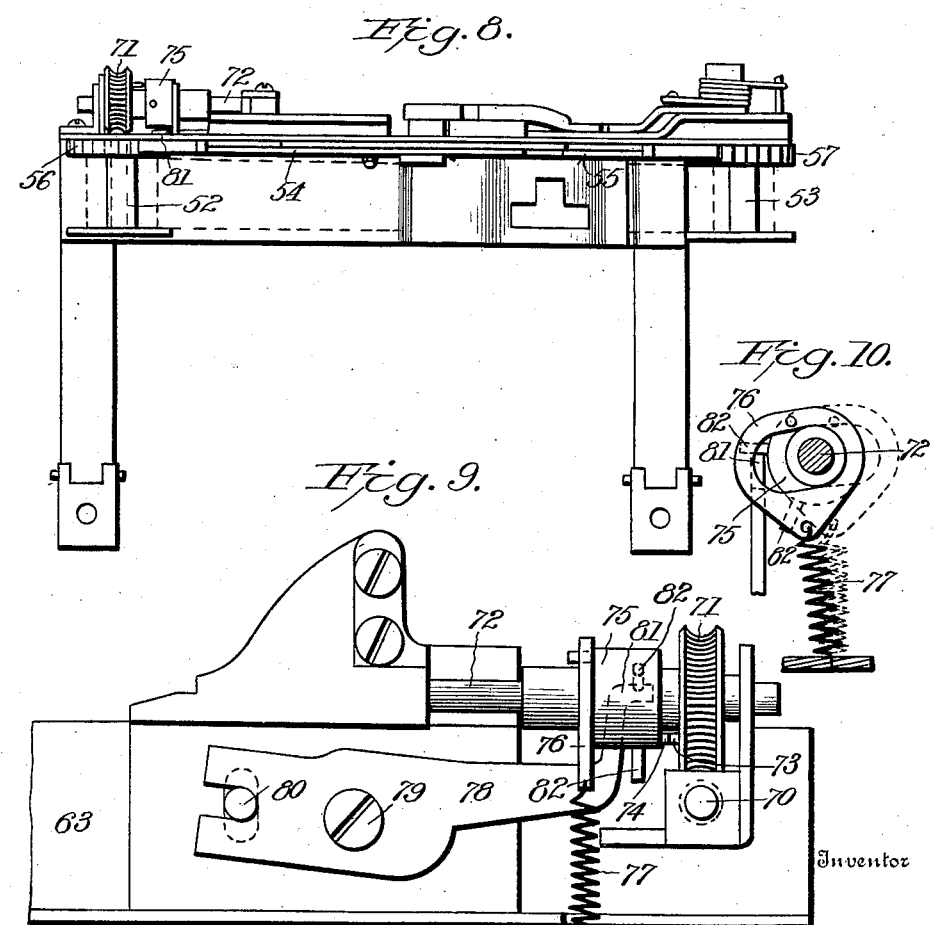

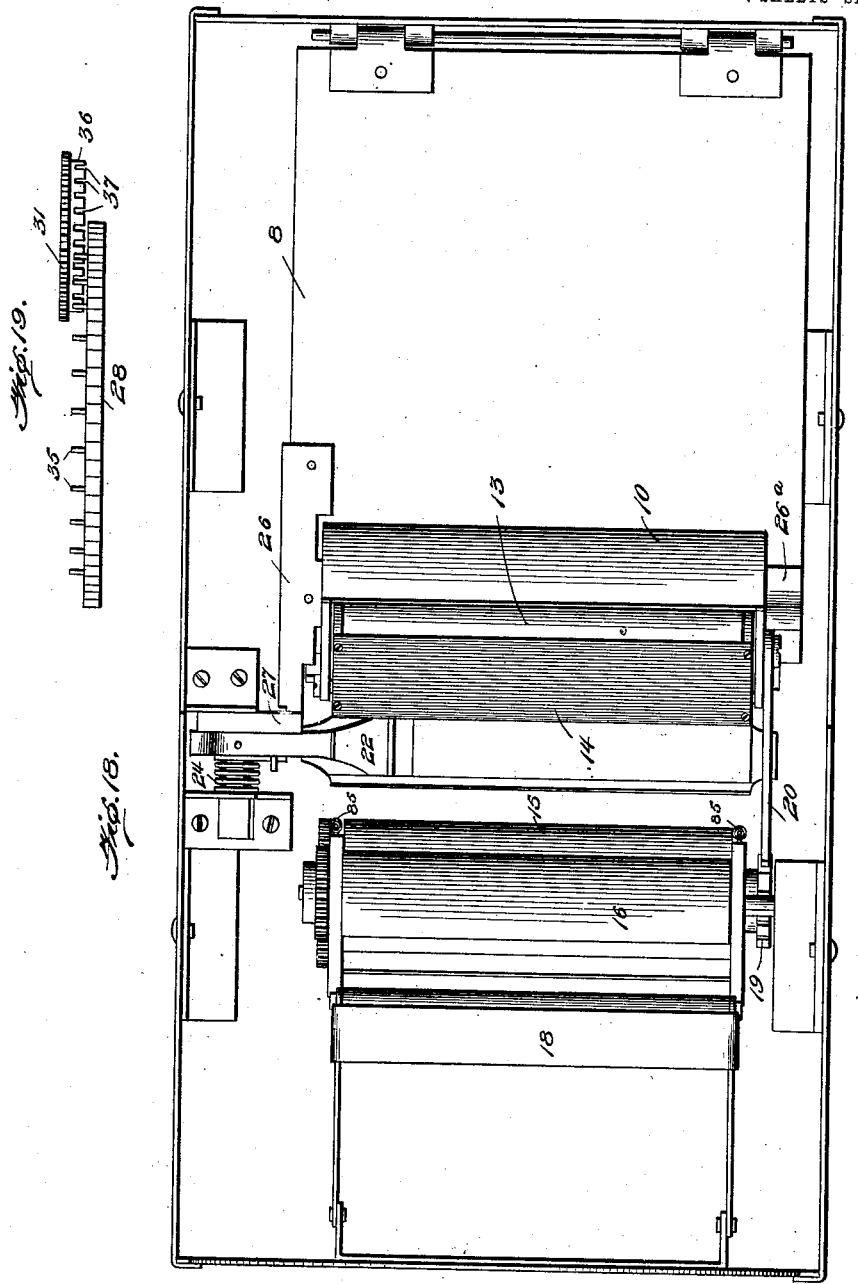

UNITED STATES PATENT OFFICE.

WILLARD D. DOREMUS, OF WASHINGTON, DISTRICT OF COLUMBIA, ASSIGNOR TO HENRY L. BRYAN, TRUSTEE, OF WASHINGTON, DISTRICT OF COLUMBIA.

AUTOGRAPH TIME-RECORDER.

No. 900,059.           Specification of Letters Patent.           Patented Sept. 29, 1908.

Application filed November 28, 1905, Serial No. 289,450. Renewed April 16, 1908. Serial No. 427,487.

*To all whom it may concern:*

Be it known that I, WILLARD D. DOREMUS, a citizen of the United States, residing at Washington, in the District of Columbia, have invented certain new and useful Improvements in Autograph Time-Recorders, of which the following is a specification.

This invention relates to autograph time recorders.

The object of the invention is to provide an autograph time recorder of simple construction wherein all the operations necessary for the carrying out of the various functions involved shall be performed by pressure on a movable hand rest arranged in position to be actuated while placing a signature on the record slip, without requiring manipulation of the parts of the mechanism by extraneous means.

With this object in view the invention consists in the general and specific construction and combination of parts substantially as hereinafter described and claimed.

In the accompanying drawing, wherein the preferred means for carrying out the various operations are shown, like characters designate corresponding parts in the several figures.

Figure 1:
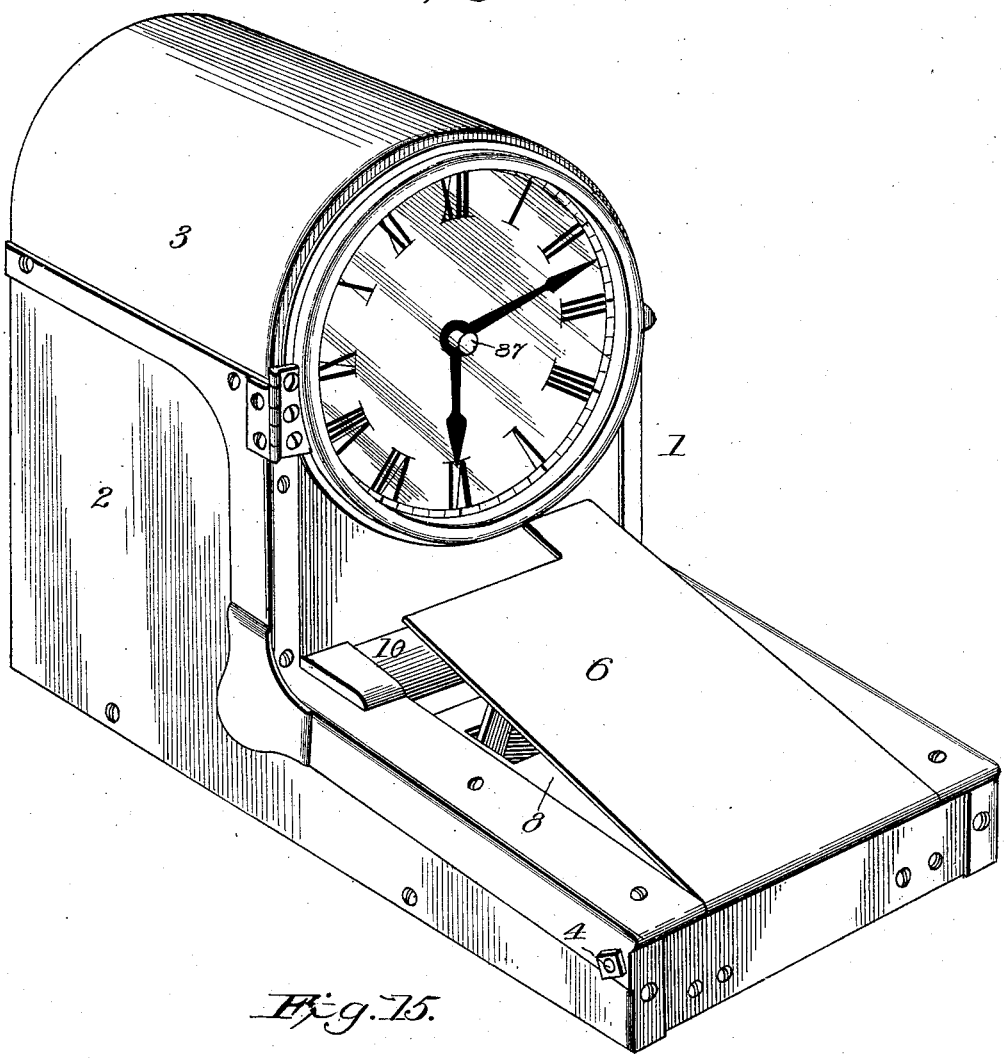
Figure 15:
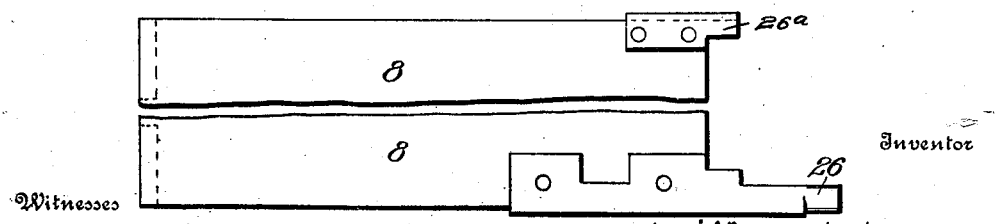

In these drawings—Figure 1 is a perspective view of the device. Fig. 2 is a side elevation of the operative parts of the recorder, the side of the casing being removed. Fig. 3 is a face view, the casing being removed, of the front of the clock mechanism, the printing disk indicating the hours actuated by the clock mechanism and showing the ink ribbon and hammer by which impression is made from the ribbon. Fig. 4 is a detached view of the clock mechanism, the printing disk for indicating the hours and the means for giving a step by step movement to the wheel. Fig. 5 is a detailed view of the printing disk for indicating minutes and the means for actuating the disk. Fig. 6 is a rear view of the clock mechanism showing also a side view of the automatic ink ribbon feed. Fig. 7 is a view showing the side of the ribbon feed opposite to that shown in Fig. 6. Fig. 8 is a plan view of the ribbon feed. Figs. 9, 10, 11 and 12 are detailed views showing the means for automatically changing the direction of feeding the ink ribbon. Fig. 13 is a detailed view of the shutter for covering the paper after a signature is written. Fig. 14 is a detailed view showing the means for giving motion to the paper feed rollers. Fig. 15 is a plan view of the depressible plate, the center thereof being broken away. Fig. 16 is a fragmentary view showing the side of the hour disk opposite to that shown in Fig. 2. Fig. 17 is a detail view particularly showing the means for locking and releasing the printing hammer. Fig. 18 is a plan view of the machine with the clock mechanism, printing disks, etc., removed in order to show the position of the parts when the plate 8 is depressed. Fig. 19 is a side view of the means for regulating the rotation of the minute printing disk.

In these drawings (1) represents the casing of the recorder in which are arranged the marking parts. The casing is made in two parts, the lower or base portion (2) and the upper portion (3). The two parts of the frame are connected by a rod (4) forming a hinge joint at the front of the machine and are secured together by a lock (5). The lower portion of the casing has secured to it the means for actuating the feed of the paper on which the names of employees or others are to be written, and the hammer for impressing on the paper characters indicating time of such writing, while the upper portion of the casing has secured to it a clock mechanism, printing disks and means for feeding an ink ribbon between the disks and the paper. Access to the interior of the machine is had by releasing the lock (5) and raising the upper portion of the casing on the hinge rod (4), permitting the introduction or removal of paper and exposing the working parts.

Pivoted to the front of the device is a plate (6) forming a hand rest which normally is retained in the position shown in Fig. (1), and which is cut away at its inner end for a distance corresponding to the length of an ordinary signature. Depending from the plate (6) are projections (7) which bear on a plate (8) hinged to the front of the casing, and beneath the plate (8) is a leaf spring (9) by which the plates (7) and (8) are returned after depressing and are normally held in the positions shown in Fig. (2).

The plate 8, illustrated in Fig. 15, has on one side a projection 26 by which the movements are given the printing hammer, and on the other side a shorter corresponding projection 26ᵃ which engages a portion of a shuttle to be described hereinafter.

A shutter (10) is pivoted in the lower portion of the casing and covers the opening exposed by the cut away end of the plate (6) until on the depression of the plates (6) and (8) a projection from the latter comes into contact with ears (11) extending from the lower portion of the shutter when the shutter is moved downward as shown in Fig. (13) exposing the paper on which a record is to be made.

In the use of the recorder a strip of paper is automatically fed by a step by step movement beneath the opening in the plate (6). To this end a roll of paper is placed on a roll carried by the shaft (12) and the free end of the paper is passed along the bottom of the casing; thence over an idle roller (13) beneath the plate (6) and over a fixed plate (14) which forms a platen arranged below the opening in plate (6) on which the paper rests when signatures are written. The paper after passing over the plate (14) extends between the feed rollers (15) and (16) which are connected by a spring 85 and thence between a roller (17) and a plate (18) on the edge of which the strip may be torn to separate the part on which a record has been made from the remainder of the strip. The feed rollers (15) and (16) are geared together at one end and at the opposite end the roller (15) has on its shaft a series of ratchet teeth (19). A pawl (20) pivoted at a point (21) on the side of the shutter (10) engages the teeth (19) and the arrangement is such that as the shutter is returned to position by the action of the spring (9) the pawl rotates the feed rollers a distance to bring the section of the paper exposed by depressing the shutter to a position between the printing disks and the hammer (22).

The hammer (22) is fixed on a shaft (23), and its striking end is arranged in such position that when raised it will be at a point below the paper adjacent to the end of the section which has been exposed by the removal of the shutter and by the opening in plate (6). Impetus is given the hammer by a coiled spring (24) on the shaft (23) one end of which spring is connected to the bearings of the shaft, the other end being connected to the hammer. An arm (25) which is rigidly attached to the shaft (23) extends into the path of a projection (26) on the plate (8) so that as the plate is depressed the hammer (22) is carried down and the spring (24) put under tension. The arm 25, Fig. 17, has a shoulder on its upper face and pivoted above the arm and bearing thereon is a dog (27) having a corresponding shoulder and also an end extending above the projection (26). As the plate reaches the limit of its downward movement the shoulder on the dog engages that on the arm and thus the hammer is retained in a depressed position until the plate reaches nearly its uppermost position when the projection (26) will release the dog 27 allowing the hammer to be thrown up by the spring.

Mounted in the upper portion (3) of the casing is a clock movement by which the printing disks (28) and (29) are rotated, through suitable intermediate mechanism, step by step in the same direction as the hands of the clock. The disk (28) has on its periphery sixty raised characters from (0) to (59) indicating minutes, while the disk (29) has on its periphery two series of characters from (1) to (12) indicating hours, those indicating the hours after 12 o'clock noon having an elongated projection beneath them as shown in Fig. 16. The disks are so arranged with respect to each other and are so driven that when as a new member on the disk (29) is presented above the hammer the (0) disk will also be presented. From this position the disk (28) is rotated step by step to present numbers (1) to (59), the disk (29) remaining stationary. When the disk (28) is moved to present the (0) on its periphery the disk (29) is simultaneously moved one step to present a succeeding number and then the disk (28) is rotated as before.

The means for imparting movement to the minute disk is illustrated in Fig. (5), a portion of the disk being broken away to more clearly show the means for giving motion to it. On the shaft 87 of the minute hand of the clock mechanism is fixed a gear (30) meshing with a gear (31) which in turn meshes with a gear (32), the three gears being of the same diameter and having corresponding teeth. The gear (32) has projecting from its center a hub (33) on which the disk (28) is loosely mounted. A leaf spring (34) is arranged at one end in a slot in the hub and at the other end is secured in a slot in the disk. The slot in the disk, at its inner end, is of a width to allow the hub to turn a short distance independently of the disk. Thus the hub may turn a short distance putting tension on the spring (34), while the disk (28) is rigidly held to permit at all times an accurate impression to be taken from the characters on its periphery and when the disk is released it will be moved instantaneously by the action of the spring. To positively control the locking and releasing of the disk the side thereof adjacent to the gear (31) is provided with a series of thirty pins (35) Fig. 19 and the gear (31) has on its face a circular projection (36) having in it a number of openings (37) corresponding to the number of the pins (35) on the disk (28). The arrangement of the gear and the disk is such that each of the pins (35), in the movement of the disk, is first brought to bear on the outer face of the projection (36) and when in the movement of the gear (31) a pin is allowed to pass through one of the openings (37) the disk will be thrown forward by the spring (34) a distance limited by the contact of a pin in advance of the one released, coming into contact with the inner face of the projection. As the latter pin escapes through an opening (37) one of the pins following it in the movement of the disk will come into contact with the outer face of the circular projection and in this way the pins each successively come into contact with the outside of the circular projection, pass through an opening, are brought against the inner face of the projection, and then escape through an opening. As there are thirty pins on the disk (28) and thirty openings in the circular projection (37), and as each pin serves both to check and to permit two partial rotations of the disk (28), a complete revolution of the disk (28) takes place synchronously with a revolution of the gear carried by the minute hand shaft.

By the described connection between the clock mechanism and the disk the latter when released is given instantaneous movements by the spring (34) to present new printing surfaces thus insuring accuracy of printing at each impact of the hammer even when such impacts follow in quick succession.

The hour printing disk (29) is loosely mounted on the hub (33) and is secured thereon in any suitable way as by the screw (38). The disk (29) is moved step by step in the direction indicated by the arrow in Fig. (4) and its position is changed at each complete revolution of the minute hand. Fixed to the gear (30) are two cams (39) and (40) which through suitable connections impart a step by step motion to the disk and check and retain the disk after each movement. A lever (41) is mounted adjacent to the disk on a pivot (42) and has at one end a projection (43) which bears on the cam (40). The other end of the lever has pivoted to it the two fingers (44) and (45) formed in one piece. The fingers are provided with a projection (46) on which bears the free end of a spring (47) attached to the lever (41). The ends of the fingers (44) and (45) are of a form to enter the spaces between the projections bearing the numbers on the periphery of the disk (29), and the ends of the fingers are such a distance apart that when pressed against the disk each will enter one of the spaces. As the upper end of the lever is forced outward from the cam (40) by the action of the latter the lower end thereof is moved away from disk (29) and the fingers will, by the action of the spring (47), be moved on their pivot to the position shown by dotted lines in Fig. (4). In this position the finger (44) receives pressure from the spring and tends to rotate the disk in the direction indicated by the arrow in Fig. (4).

A lever (48) is arranged on the pivot (42) and has at one end a nib (49) having one edge beveled as shown. The nib is of a width to enter the spaces between the projections on the periphery of the disk (29) and its function is to retain the disk against rotating when the fingers (44) and (45) are in the positions shown by dotted lines in Fig. (4), until the minute disk moves from the character (59) to the character (0). To accomplish this the lever (48) has on it opposite the nib (49) a projection (50) which bears on the edge of the cam (39). The movements of the parts are so timed that when the minute printing disk (28) is in position to change to present the (0) on its periphery to the action of the hammer, the fingers (44) and (45) are in the position shown by dotted lines in Fig. (4). At this time the projection (50) on the lever (48) is opposite to and enters the depression in the cam (39) thus releasing the disk from the nib, and the pressure of the spring (47) on the fingers (44) and (45) causes the finger (44) to move the disk (29) forward, the nib by reason of its beveled side being forced out of the space in which it rested by the force of the spring (47). This movement of the disk is limited to a distance of one notch by the finger (45) entering a notch adjacent to that from which it was removed by the action of the cam (40) on the lever (41). As the gear (30) continues to revolve the projection (50) rides outward on the cam (39) and the nib (49) is brought into a space on the periphery of the disk (29) preparatory to holding the latter when the fingers (44) and (45) are again brought into action.

The ink ribbon (51) by which the characters on the printing disks are marked on the paper record is carried on two spools (52) and (53), so arranged that the ribbon extending from one spool to the other passes between the disks and the paper. In order constantly to present new surfaces of the ribbon the spools are actuated at each operation of printing. Movement is given the spools through pawls (54) and (55) which respectively engage ratchet wheels (56) and (57) respectively attached to the shafts of the spools (52) and (53). By the construction to be hereinafter described the pawls are automatically thrown into and out of engagement with the ratchets with which they engage.

A movement to reciprocate the pawls at each operation of the hammer is communicated from the hammer shaft by a projection (58) secured on such shaft. Mounted adjacent to the projection is a bell crank lever (59) one end thereof being struck as the hammer is forced downward and the other end is forked and engages the end of a lever (60) which in turn engages a socket in a projection (61) fixed on a shaft (62) projecting through a plate (63) on which the spools and the means for operating them are mounted. An arm (64) is fixed to the end of the shaft (62) opposite to that carrying the projection (61) and the inner ends of the pawls are pivotally connected to the arm. A spring (86) connects the pawls and tends to draw the outer ends of the pawls upward into engagement with their respective ratchets. The positions of the pawls are governed by the engagement with them of pins (66) and (67) carried by a plate (68) interposed between the pawls and the supporting plate (63) and pivotally mounted on a shaft (62). The plate is capable of tilting to bring the respective pawls into or out of engagement with the ratchet wheels, and a spring clip (69) binding the plate (68) to the supporting plate (63) affords sufficient friction to retain the plate (68) in either position in which it may be placed.

In order that the plate (68) may be shifted automatically to bring the pawls alternately into and out of action, the shaft of the spool (52) is formed with a worm (70) and this worm meshes with a worm gear (71) mounted on a spindle (72). A pin (73) projects from the gear (71) and this pin projects into the path of a pin (74) extending from the side of a collar, (75) loosely mounted on the spindle. A plate (76) is pivotally connected to the collar and this plate has in it an elongated opening receiving the spindle (72). To the lower end of the collar is attached a spring (77), the other end of the spring being attached to a stationary part of the device. A forked lever (78) is pivoted at a point (79) to the supporting plate and the fork thereof engages a stud (80) fixed to the plate (68) and extending through an elongated opening in the supporting plate (63). The other end of the lever (78) has an end (81) which extends to a position to be engaged by one of the pins (82), (82) projecting from the face of the collar (75).

In the positions of the parts as shown in Fig. (7) the spool (53) is rotated in the direction of the arrow at each depression of the hammer and this movement is communicated through the ribbon to the spool (52), rotating the worm (70). When the pin (73) on the gear (71), driven by the worm engages the pin (74) on the collar (75), the collar will be carried with the gear until the point of attachment of the plate (76) to the collar passes beyond the center of the spindle (72) when the spring (77), acting through the plate, will throw the collar to force one of the pins (82) against the end (81) of the lever (78) forcing it down and, thereby shifting the plate to remove the pawl (55) from engagement with the ratchet (57) and bringing the pawl (54) into engagement with the ratchet (56). Subsequent impulses imparted to the pawl (54) will result in rotating the worm in a direction opposite to that in which it was formerly moved, and when the collar is again thrown by the action of the spring, a pin (82) on the collar engaging the projection (81) will move the latter upward returning the parts to the positions shown in Fig. (7).

In the use of the recorder pressure is put upon the pivoted hand rest and the latter is forced down carrying with it the depressible plate (8). As the plate is moved down the spring (9) is put under tension and the hammer is carried down against its operating spring and is locked by the dog (27). When the hand rest reaches a point to bring it level with the portion of the casing to which it is attached the plate (8) engages the ears on the shutter exposing a section of the paper strip. After the signature is written the hand rest is released allowing the spring (9) to throw up the plate (8) carrying with it the shutter which in its downward position rests on the plate. As the shutter moves upward the feed roller is moved one step by the action of the pawl 20 bringing that portion of the paper strip on which the signature has been written between the printing disks and the hammer. As the plate (8) reaches the limit of its upward movement, the projection 26 trips the dog 27 and releases the hammer allowing the spring (24) to force the hammer to strike the paper and force the latter covered by the ink ribbon against the printing disks, thus impressing on the paper the characters occupying the lowest positions on the printing disks which characters correspond to the time indicated by the hands of the clock mechanism. It is impossible to tamper with the record made by the machine for the reason that the paper is moved to carry the signature into the casing immediately upon the release of the hand rest, and the printing of the time takes place in an inaccessible position.

Having thus described my invention, what I claim as new and desire to secure by Letters Patent is:—

1. A time recorder comprising a depressible plate, a pivoted shutter operated by the plate, a paper feed roller, a pawl connecting the feed roller and the shutter whereby as the shutter oscillates the roller is rotated, a spring actuated hammer, and means connected with the hammer whereby as the plate is depressed the spring of the hammer is placed under tension and is released as the plate is returned to its normal position, substantially as described.

2. A time recorder comprising a depressible plate, a spring arranged below the plate, a pivoted shutter having ears engaged by a projection from the plate, a paper feed roller, a connection between the shutter and the feed roller whereby the feed roller is operated by the oscillation of the shutter, time printing disks, a spring actuated hammer, and means connected with the hammer whereby as the plate is depressed the spring of the hammer is placed under tension and is released as the plate returns to its normal position, substantially as described.

3. A time recorder comprising a pivoted plate forming a hand rest and having therein an opening, a depressible plate on which the pivoted plate bears, a pivoted shutter adapted to oscillate to cover and uncover a strip of paper, a paper feed roller over which the paper passes, a connection between the shutter and the feed roller whereby the roller is rotated by the oscillation of the shutter, time printing disks, a spring operated hammer, and means connected with the hammer whereby as the pivoted plate is depressed the spring of the hammer is placed under tension and is released as the plate returns to its normal position, substantially as described.

4. A time recorder comprising a depressible plate, a pivoted shutter having ears engaged by the plate, a paper feed roller having ratchet teeth, a pawl on the shutter engaging the teeth, printing disks, a spring actuated hammer, a projection from the hammer arranged in the path of movement of the plate and a dog for engaging the projection also arranged in the path of movement of the plate, substantially as described.

5. A time recorder comprising a depressible plate, a pivoted shutter having a projection extending into the path of movement of the plate, a paper feed roller, a pawl and ratchet connection between the shutter and the feed roller, printing disks, a spring actuated hammer, an ink ribbon interposed between the printing disk and the hammer and means for automatically feeding the roller alternately in opposite directions, substantially as described.

6. A time recorder comprising a depressible plate, a pivoted shutter having a projection extending into the path of movement of the plate, a paper feed roller, a connection between the shutter and the feed roller whereby as the shutter is oscillated the roller is rotated, printing disks, a spring operated hammer, ribbon spools, pawls for operating the spools, and means actuated by the hammer whereby the pawls are reciprocated, substantially as described.

7. A time recorder comprising a depressible plate, a pivoted shutter having a projection extending into the path of movement of the plate, a paper feed roller, a connection between the shutter and the feed roller whereby as the shutter is oscillated the roller is rotated, printing disks, a spring operated hammer, ribbon spools, pawls for operating the ribbon spools, means actuated by the hammer whereby the pawls are reciprocated, and means for automatically moving the respective pawls alternately into and out of operative position, substantially as described.

8. A time recorder comprising a depressible plate, a pivoted shutter adapted to be oscillated by the movement of the depressible plate, a paper feed roller, a pawl and ratchet connection between the pivoted shutter and the feed roller whereby as the shutter oscillates the roller is rotated, a printing disk having characters indicating hours, a printing disk having characters indicating minutes, a clock mechanism, means connecting the clock mechanism and the printing disks whereby the latter are each rotated step by step, a spring actuated hammer, and an ink ribbon interposed between the printing disks and the hammer, substantially as described.

9. A time recorder comprising a depressible plate, a paper feed roller, a printing disk bearing characters indicating hours and having a series of indentations in its periphery, a clock mechanism, two cams carried by the shaft of the minute hand of the clock mechanism, a lever having pivoted thereto two spring pressed fingers adapted to enter the indentations in the periphery of the disk and bearing at one end on one of the cams, and a movable stop bearing at one end against the other cam and having the other end adapted to engage the indentations, a spring actuated hammer, and an ink ribbon interposed between the printing disk and the hammer, substantially as described.

10. A time recorder comprising a depressible plate, a paper feed roller, a printing disk bearing characters indicating minutes and having a series of pins projecting from one side thereof, a clock mechanism, a gear attached to the minute hand shaft of the clock mechanism, a gear having a hub on which the disk is mounted, a leaf spring connecting the disk and the gear having the hub, and an intermediate gear having on its side a circular projection having a number of openings corresponding to the pins on the disk, each of the pins being adapted to engage the outside of the projection, pass through one of the openings therein and subsequently to engage the inner face of the projection and then pass through one of the openings, a spring actuated hammer, and an ink ribbon interposed between the disk and the hammer, substantially as described.

In testimony whereof I affix my signature in presence of two witnesses.

WILLARD D. DOREMUS.

Witnesses:
JOHN H. SIGGERS,
BLANCHE J. KALDENBACK.